Figure 1:
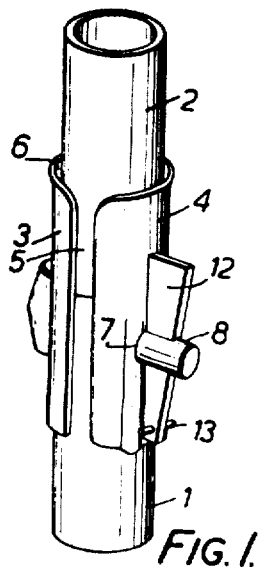

United States Patent
Gostling

[15] 3,707,304
[45] Dec. 26, 1972

[54] BUILDERS' SCAFFOLDING

[72] Inventor: Peter Eric Gostling, Sutton Coldfield, England

[73] Assignee: Kwikform Limited, Birmingham, England

[22] Filed: Sept. 8, 1970

[21] Appl. No.: 70,088

[30] Foreign Application Priority Data

Sept. 13, 1969 Great Britain ........45258/69
Apr. 25, 1970 Great Britain ........19985/70

[52] U.S. Cl. .............................287/111, 182/178
[51] Int. Cl. ........................................F16b 7/04
[58] Field of Search............187/111, 110, 118, 53.5; 248/354 P, 412; 182/178

[56] References Cited

UNITED STATES PATENTS

| | | | |
|---|---|---|---|
| 2,030,550 | 2/1936 | Smith | 287/111 |
| 2,071,270 | 2/1937 | Dellinger | 287/111 X |
| 2,613,904 | 10/1952 | Sato | 248/354 P |
| 2,696,649 | 12/1954 | Clapper | 287/118 X |
| 760,598 | 5/1904 | Wynegar | 287/118 |
| 1,843,925 | 2/1932 | Kempf | 85/7 |
| 2,237,572 | 4/1941 | Manion | 182/178 X |

*Primary Examiner*—Andrew V. Kundrat
*Attorney*—Young & Thompson

[57] ABSTRACT

Builders' scaffolding comprising means for securing two scaffolding uprights together in alignment including a split outer sleeve transversely pinned to the end of one upright to form a socket which grips the end of another upright when the pinning is tightened by means such as a wedge. The socket may be flared and may include an inner sleeve preferably shorter in the first upright. Pinning may be by means of a pin with a tee head aligned in a longitudinal groove in the outer sleeve and slotted to take a wedge parallel to the tee head. The wedge is preferably captive, tightened by driving it downwardly, and rotatable with the pin when loose to hang downwardly. A tension connection to permit assembled scaffolding to be crane lifted may be provided in addition by radial stud and hole engagement between the outer sleeve and the gripped end of the inserted upright.

8 Claims, 4 Drawing Figures

PATENTED DEC 26 1972 3,707,304

INVENTOR
PETER ERIC GOSTLING
BY Young + Thompson
ATTORNEYS

BUILDERS' SCAFFOLDING

This invention relates to builders' scaffolding and is concerned with the means by which two upright members are secured together in axial alignment with each other for the purpose of increasing the height of the scaffolding.

In one known means for securing two scaffolding uprights together in alignment with each other an expansible tubular spigot at the end of one of the members is adapted to project into a socket of the other member whereafter the spigot is expanded to hold the members firmly together. To be expansible the tubular spigot is made as two separate arcuate portions extending side by side, one of the portions being fixed to the bore of the member while the other is displaceable radially towards and away from the fixed portion.

Although the known securing means operate satisfactorily they have the disadvantage that welding is required inside the bore of the member. The object of the present invention is to provide improved means for securing two scaffolding uprights together, with which inside welding is unnecessary and all welding may be dispensed with if desired.

According to one aspect of the invention means for securing two scaffolding uprights together in alignment with each other comprise a split outer sleeve for attachment to the end of one of the uprights, a through pin to pass through aligned holes in the upright and sleeve to hold the sleeve to the upright as an assembly, with the end of the sleeve projecting beyond the end of the upright to form a socket, and tightening means associated with the through pin to effect contraction of the socket to grip the end of the second upright offered thereinto in end-to-end alignment with the first upright.

The securing means may, if desired, also comprise an inner sleeve having holes capable of alignment with those in the upright and outer sleeve so that the said inner sleeve extends as a spigot within the socket formed by the outer sleeve, the end of the second upright being received within the space left between the inner and outer sleeves. Preferably the end of the outer sleeve is outwardly lipped so that the socket is of flared formation at its free end to provide ease of entry for the second upright. For the same purpose the inner sleeve may be of such shorter length from its through holes to its free end than is the outer sleeve, as to result in the latter engaging the second upright somewhat in advance of its engagement by the spigot.

Preferably the outer sleeve comprises two separate arcuate portions disposed with their concave surfaces towards each other but leaving a gap between their facing edges sufficient to render the sleeve contractible about the end of the second upright. The through pin may be headed at one end and provided with the aforesaid tightening means at the other end. Such tightening means preferably comprise a wedge engaged in a slot extending diametrically through the pin, said wedge being arranged for wedging movement with one of its faces engaged against the sleeve and another against one end of the slot. Thus, the through pin is held captive to the sleeve and upright assembly by the wedge while the latter is preferably provided with means whereby it is itself held captive in the slot of the through pin.

It is desirable that the wedging movement of the wedge should occur in a direction parallel to the sleeve axis and to this end the through pin is preferably T-headed and the slot formed in the same plane as the head of the T and the axis of the pin shank, means being provided to guide the head of the pin, and consequently the wedge, in a direction parallel to the sleeve axis. Such guide means may comprise a channel or trough extending longitudinally of the sleeve from the holes formed therein to receive the through pin. The channel or trough may be formed by swaging the wall of the sleeve.

A tension connection between the two scaffolding uprights is sometimes required, in which case the split outer sleeve may have a radial stud and hole engagement with the gripped end of the second upright. For example, the sleeve may have a hole formed in the portion of it which projects beyond the end of the first upright while the second upright has a stud welded or otherwise attached to its outer surface towards its lower end, its position being such that with the two uprights in end-to-end alignment the stud may be engaged in the hole. When the split outer sleeve comprises two separate arcuate portions each of the said portions may have a hole formed therein in a position suitable to receive the stud when the uprights are in end-to-end alignment.

Thereby a tension connection between the scaffolding uprights is obtained which provides a simple means for handling sections of erected scaffolding by crane without the necessity for frequent dismantling and re-erection.

In accordance with another aspect of the invention means for securing two scaffolding uprights together in alignment with each other comprise an outer sleeve and an inner sleeve for attachment to the end of one of the uprights, and a through pin to pass through aligned holes in the upright and sleeves to hold the sleeves to the upright to form a coaxial spigot and socket to receive between them the end of the second upright in end-to-end alignment with the first upright.

The invention may also comprise a scaffolding upright having a split outer sleeve attached to one of its ends by means of a through pin which passes through aligned holes in the upright and sleeve to hold the sleeve to the upright as an assembly, with the end of the sleeve projecting beyond the end of the upright to form a socket, tightening means being associated with the through pin to effect contraction of the socket to grip the end of a second upright offered thereinto in end-to-end alignment with the upright to which the split outer sleeve is attached.

Alternatively the invention may also comprise a scaffolding upright having an outer sleeve and an inner sleeve attached to one of its ends by means of a through pin which passes through aligned holes in the upright and sleeves to hold the sleeves to the upright as an assembly, with the ends of the sleeves projecting beyond the end of the upright to form a coaxial spigot and socket to receive between them the end of a second upright in end-to-end alignment with the upright to which the sleeves are attached.

An illustrative embodiment of the invention for securing two scaffolding upright tubes together in alignment with each other will now be described, by way of example, with reference to the accompanying drawings.

Figure 3:
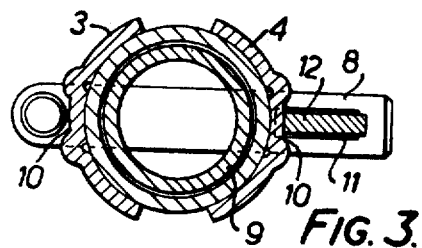
Figure 2:
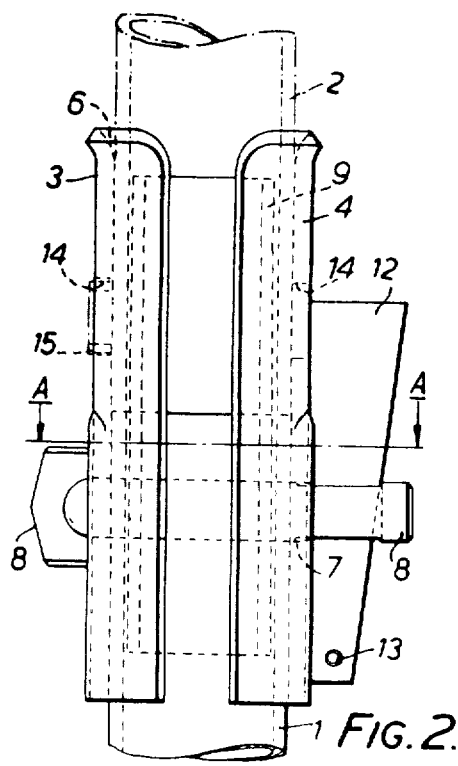
Figure 4:
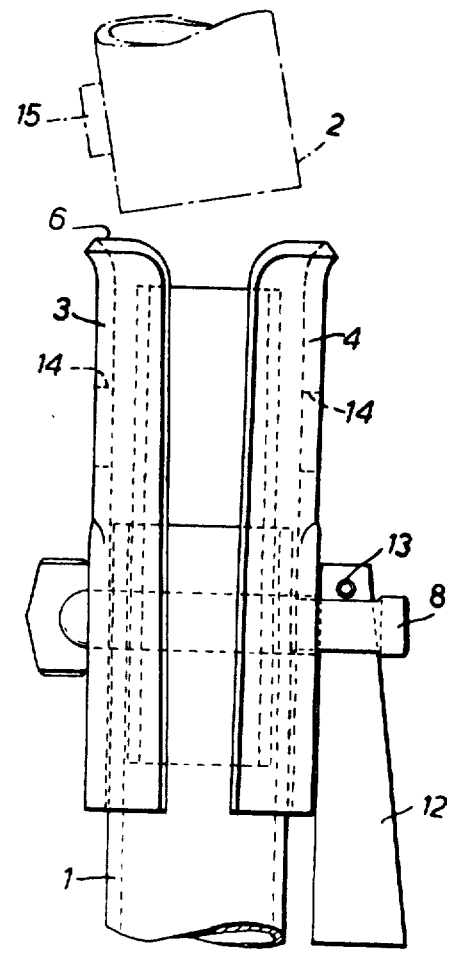

In the drawings:

FIG. 1 is a perspective view of two scaffolding upright tubes secured together in alignment, FIG. 2 is a side view of the arrangement of FIG. 1, FIG. 3 is a cross-section at the plane AA of FIG. 2, and FIG. 4 is a view like FIG. 2 but showing the upper upright tube detached.

Referring to the drawings, the means for securing two tubes 1 and 2 together take the form of a head fitting for the lower tube 1 so that the upper tube 2 can be dropped into the socket formed by the fitting at the upper end of the tube 1 in order to constitute an aligned upward extension of the latter. The socket formed by the head fitting is provided by a pair of sleeve portions 3 and 4 the plan form of each of which is a circular arc subtending an angle of about 140° at the center, as shown in FIG. 3. The inside radius of the portions 3 and 4 is about the same as the outside radius of the upright tubes so that when the portions 3 and 4 are placed symmetrically about the outside of the upright tube 1 they constitute a split outer sleeve for the latter with a diametrical split or gap 5 running the length of the sleeve. At one end each portion 3 or 4 is outwardly lipped to provide a flared end 6 for the socket and at a point nearer the other end of the sleeve the two portions 3 and 4 are provided with holes 7 which may be aligned with a hole formed diametrically through the lower tube 1 at a point sufficiently near its upper end for the outer sleeve 3,4 to project beyond the end of the tube 1 to form the aforesaid socket.

The two sleeve portions 3 and 4 are identical and attached to the tube 1 in the position already described by means of a T-headed pin 8 which passes through the aligned holes in the tube 1 and portions 3 and 4 to hold the split outer sleeve so formed to the upright as an assembly. The pin 8 also passes through a hole formed diametrically through a tube 9 of shorter length and smaller radius than the outer sleeve, the outside radius of the tube 9 being in fact about the same as the inside radius of the tubes 1 and 2 so that it fits within the tube 1 to form an inner sleeve coaxial with the outer sleeve. The inner sleeve is shorter than the outer sleeve and terminates short of the latter at both its upper and lower ends. It forms a hollow spigot assisting in the location of the upper tube 2 which is received in the annular space between the outer and inner sleeves and seats with its lower end against the upper end of the lower upright tube 1. The flaring of the upper end of the outer sleeve, coupled with the fact that it is disposed in advance of the adjacent end of the inner sleeve 9, eases the insertion of the upper upright tube 2 into position.

In order to locate the T-headed pin 8 with the head of the T parallel to the axis of the outer sleeve, the two sleeve portions 3 and 4 each have the hole 7 disposed therein so as to lie within and towards the upper end of a longitudinal trough or channel 10 extending from just above the hole to the lower or non-flared end of the outer sleeve. The trough or channel 10 may be formed by swaging the wall of the sleeve portion 3 to produce two parallel ridges, one on each side of the hole 7, leaving the latter lying in the trough 10 between the ridges. Towards the other end of the through pin 8 which projects from the sleeve portion on the other side of the upright tube 1 from that against which the head of the T lies, the pin has a diametric slot 11 in the same plane as the head of the T so that with the latter lying in the channel or trough 10 of the sleeve portion 3 the slot is in the same plane as the channel or trough 10 in the sleeve portion 4. With the head of the pin 8 lying in the corresponding channel or trough 10 and the portions 3 and 4 closely embracing the tube 1 the inner end of the slot 11 extends somewhat inwardly of the outer surface of the sleeve portion 4. A wedge 12 is arranged for wedging movement in the slot 11, the wedging effect occurring between the sleeve portion 4 and the outer end of the slot 11 in order to effect contraction of the split sleeve 3,4 about the two uprights 1 and 2. During such wedging movement the wedge 12 is guided in the channel or trough 10 of the sleeve portion 4.

The wedge 12 as shown in FIGS. 1 and 2 is arranged with its thin end down, so that it can be driven downwardly to effect contraction of the split sleeve 3,4. To loosen the sleeve, for insertion or removal of the upper upright tube 2, the wedge 12 is knocked upwardly so that its thin end lies in the slot 11, complete removal of the wedge from the slot being prevented by a tension pin 13, split pin or other wedge-retaining element passing through a hole in the thin end of the wedge 12. Due to the provision of this wedge-retaining element, with the thin end of the wedge 12 lying in the slot 11 the wedge and pin may be rotated through 180°, to the position shown in FIG. 4, with the head of the T and the wedge riding over their guide channels or troughs, so that the thick end of the wedge 12 hangs downwardly and there is no tendency for the head fitting to be locked by gravity. In this configuration an upper upright tube 2 can be removed or inserted. When on insertion the upper upright tube has been dropped into position the wedge and pin are returned through 180° and the wedge tightened as already described.

In order to obtain a tension connection between the upright tubes 1 and 2, to enable whole sections of erected scaffolding to be handled by crane as is frequently required particularly on motorway projects, each of the sleeve portions 3 and 4 is formed with a hole 14 in the portion of its wall between its outwardly lipped end 6 and the hole 7 receiving the pin 8, such that the holes 14 are clear of the upper end of the upright tube 1 to which the sleeve portions 3 and 4 are attached, and each upright tube has a stud 15 welded thereto near its lower end so as to project radially outwards from its wall, the stud 15 of an upper upright tube such as 2 taking into a hole 14 of the head fitting of an associated lower upright tube such as 1 and being held securely therein when the corresponding wedge such as 12 is tightened. Thereby a sufficiently firm tension connection between the upper and lower uprights 1 and 2 is obtained for crane handling in erected state, particularly when the head fitting includes also an inner sleeve such as 9 to form a hollow spigot as already described.

I claim:

1. Means for securing two scaffolding uprights together in alignment with each other comprising a split outer sleeve for attachment to the end of one of the uprights, an inner sleeve, a through pin to pass through aligned holes in the upright and the sleeves to hold the sleeves to the upright as an assembly, with the end of the outer sleeve projecting beyond the end of the upright to form a socket and with the inner sleeve extending as a spigot within the socket formed by the outer sleeve, and tightening means associated with the through pin to effect contraction of the socket to grip, in end-to-end alignment with the first upright, the end of the second upright inserted in the outer sleeve to embrace the inner sleeve.

2. Securing means according to claim 1, wherein one end of the outer sleeve is outwardly lipped so that the socket is of flared formation at its free end to provide ease of entry for the second upright.

3. Securing means according to claim 1, wherein the inner sleeve is of such shorter length from its through holes to its free end than is the outer sleeve, as to result in the latter engaging the second upright somewhat in advance of its engagement by the spigot.

4. Means for securing two scaffolding uprights together in alignment with each other comprising a split outer sleeve for attachment to the end of one of the uprights, a through pin to pass through aligned holes in the upright and sleeve to hold the sleeve to the upright as an assembly, with the end of the sleeve projecting beyond the end of the upright to form a socket, and tightening means associated with the through pin to effect contraction of the socket to grip the end of the second upright offered thereinto in end-to-end alignment with the first upright, said tightening means comprising a wedge engaged and held captive in a slot extending diametrically through the pin, said wedge being arranged for wedging movement with one of its faces engaged against the sleeve and another against one end of the slot.

5. Securing means according to claim 4, wherein the pin with the wedge in the slot thereof is rotatable to permit the wedge to be driven downwardly for tightening and also to permit the wedge to hang downwardly when loose in the slot.

6. Securing means according to claim 4, wherein the through pin is T-headed and the slot is formed in the same plane as the head of the T and the axis of the pin shank, means being provided to guide the head of the pin, and consequently the wedge, in a direction parallel to the sleeve axis.

7. Securing means according to claim 6, said guide means comprising a channel or trough extending longitudinally of the sleeve from the holes formed therein to receive the through pin.

8. Means for securing two scaffolding uprights together in alignment with each other comprising a split outer sleeve for attachment to the end of one of the uprights, a through pin to pass through aligned holes in the upright and sleeve to hold the sleeve to the upright as an assembly, with the end of the sleeve projecting beyond the end of the upright to form a socket, and tightening means associated with the through pin to effect contraction of the socket to grip the end of the second upright offered thereinto in end-to-end alignment with the first upright, said outer sleeve having a radial stud and hole engagement with the gripped end of the second upright in order to form a tension connection between said two uprights.

* * * * *